(12) United States Patent
Massarotto et al.

(10) Patent No.: US 6,655,944 B2
(45) Date of Patent: Dec. 2, 2003

(54) APPARATUS FOR THE CONTINUOUS PRODUCTION OF EXPANDED PLASTICS PANELS WITH INSERTS ON THE LONGITUDINAL EDGES THEREOF

(75) Inventors: Loris Massarotto, Truggio (IT); Enrico Lombardini, Milan (IT)

(73) Assignee: Impianti Oms S.p.A., Verano Brianza (IT)

(*) Notice: Subject to any disclaimer, the term of this patent is extended or adjusted under 35 U.S.C. 154(b) by 162 days.

(21) Appl. No.: 09/863,380

(22) Filed: May 24, 2001

(65) Prior Publication Data

US 2002/0069951 A1 Jun. 13, 2002

(30) Foreign Application Priority Data

Dec. 12, 2000 (IT) ...................................... MI2000A2683

(51) Int. Cl.[7] .......................... B29C 44/30; B29C 44/32
(52) U.S. Cl. ...................... 425/115; 425/224; 425/371; 425/817 C; 264/46.2; 264/46.3
(58) Field of Search ................................ 425/115, 224, 425/4 C, 817 C, 371; 264/46.2, 46.3, 46.5

(56) References Cited

U.S. PATENT DOCUMENTS

| | | | | |
|---|---|---|---|---|
| 3,646,715 A | * | 3/1972 | Pope | 52/309.9 |
| 3,715,417 A | | 2/1973 | Pope | 264/46.5 |
| 3,838,957 A | * | 10/1974 | Koide et al. | 425/174.6 |
| 4,043,719 A | | 8/1977 | Jones | 425/115 |
| 4,517,764 A | * | 5/1985 | Dedolph | 47/77 |
| 6,045,350 A | * | 4/2000 | Cretti | 425/364 R |
| 6,240,691 B1 | * | 6/2001 | Holzkaemper et al. | 52/315 |

FOREIGN PATENT DOCUMENTS

DE 197 20 078 5/1998

* cited by examiner

*Primary Examiner*—Robert Davis
*Assistant Examiner*—Joseph S Del Sole
(74) *Attorney, Agent, or Firm*—Guido Modiano; Albert Josif; Daniel J. O'Bryne

(57) ABSTRACT

An apparatus for the continuous production of expanded plastic panels with inserts on their longitudinal edges, comprising a head for pouring a reactive mixture between a first and a second containment layers in order to obtain a foamed layer, a containment and advancement assembly for the layers being constituted by a lower slat conveyor and by an upper slat conveyor. The lower slat conveyor has lateral containment blocks at the ends of its slats. At least some of the blocks are provided thereon with the inserts to be incorporated in the foamed layer, for picking and placing the inserts on the engaging elements provided in the apparatus.

14 Claims, 3 Drawing Sheets

APPARATUS FOR THE CONTINUOUS PRODUCTION OF EXPANDED PLASTICS PANELS WITH INSERTS ON THE LONGITUDINAL EDGES THEREOF

BACKGROUND OF THE INVENTION

The present invention relates to an apparatus for the continuous production of expanded plastics panels with inserts on the longitudinal edges thereof.

It is known that plants for the continuous production of low-density rigid foam panels for thermal insulation which have a rectangular or otherwise variously shaped cross-section, have long been commercially available.

Said panels are manufactured by inserting between two layers a liquid reactive mixture which is usually constituted by reagents such as isocyanate and polyol, water, catalysts and the like and by optional blowing agents, such as hydrocarbons, hydrochlorofluorocarbons, hydrofluorocarbons and the like.

Within a few seconds, the reactive mixture starts to react, generating heat and carbon dioxide produced by the isocyanate-water reaction.

The carbon dioxide, together with the gases generated by evaporation of any blowing agents, due to the heat generated by the chemical reactions, expands the reactive mixture so as to form the foam; this expansion requires the two containment layers to be adequately contrasted, so as to prevent any deformation thereof, during the foam expansion step.

During the growth and polymerization step, the reactive mixture is contained between the two layers, which are conveyed by means of appropriate movable conveyance and containment systems, such as for example double conveyor belts, with suitable lateral containment systems.

At the exit of the containment and conveyance means, the continuous panel, which by now has polymerized sufficiently, is cut by a cutter into individual panels of the intended length.

In many cases large surfaces need to be covered with the panels and it is therefore necessary to laterally couple the panels together.

For this purpose, the panels usually have appropriately shaped edges so as to allow their lateral mutual joining by means of various interlocking coupling elements and/or overlaps.

Moreover, in some applications it is useful to have panels with integrated lateral engagement systems or inserts which facilitate the assembly and possible disassembly of said panels.

Lateral inserts can be applied easily and rapidly in the case of the production of panels using discontinuous or batch molding methods, in which the inserts are positioned exactly, with the required spacing, inside the mold before the foaming operation.

In the continuous production of panels it is currently very difficult to perform exact automatic insertion of the inserts with a positioning which correctly maintains alignment on the two sides and the required spacing, which may be variable during production, without interrupting the production itself.

SUMMARY OF THE INVENTION

The aim of the invention is to solve the above described problem, by providing an apparatus for the continuous production of expanded or foamed plastics panels with inserts on their longitudinal edges which allows the precise positioning of the insert between the layers for containing the panel being manufactured, before foaming the plastic material, so that the plastic material incorporates said inserts and anchors them.

Within this aim, a particular object of the invention is to provide an apparatus which allows to always have a precise reference of the inserts on both sides of the panel, thus contributing to easy positioning.

Another object of the present invention is to provide an apparatus in which it is possible to position the inserts at the intended spacings without thereby having to introduce particular changes to the operating steps.

Another object of the present invention is to provide an apparatus which, thanks to its particular constructive characteristics, is capable of giving the greatest guarantees of reliability and safety in use and is also competitive from a merely economical point of view.

This aim and these and other objects which will become better apparent hereinafter are achieved by an apparatus for the continuous production of expanded plastics panels with inserts on their longitudinal edges, according to the invention, which comprises a head for pouring a reactive mixture between a first and a second containment layers for obtaining a foamed layer, a containment and advancement assembly for said first and second layers being further provided, said assembly being constituted by a lower slat conveyor and by an upper slat conveyor, said lower slat conveyor having lateral containment blocks at the ends of its slats, characterized in that it comprises, on at least some of said blocks, means for engaging the inserts to be incorporated in said foamed layer and means for picking and placing said inserts on said engagement means.

BRIEF DESCRIPTION OF THE DRAWINGS

Further characteristics and advantages will become better apparent from the description of a preferred but not exclusive embodiment of an apparatus for the continuous production of expanded plastics panels with inserts on their longitudinal edges, illustrated only by way of non-limitative example in the accompanying drawings, wherein.

DESCRIPTION OF THE PREFERRED EMBODIMENTS

Figure 1:
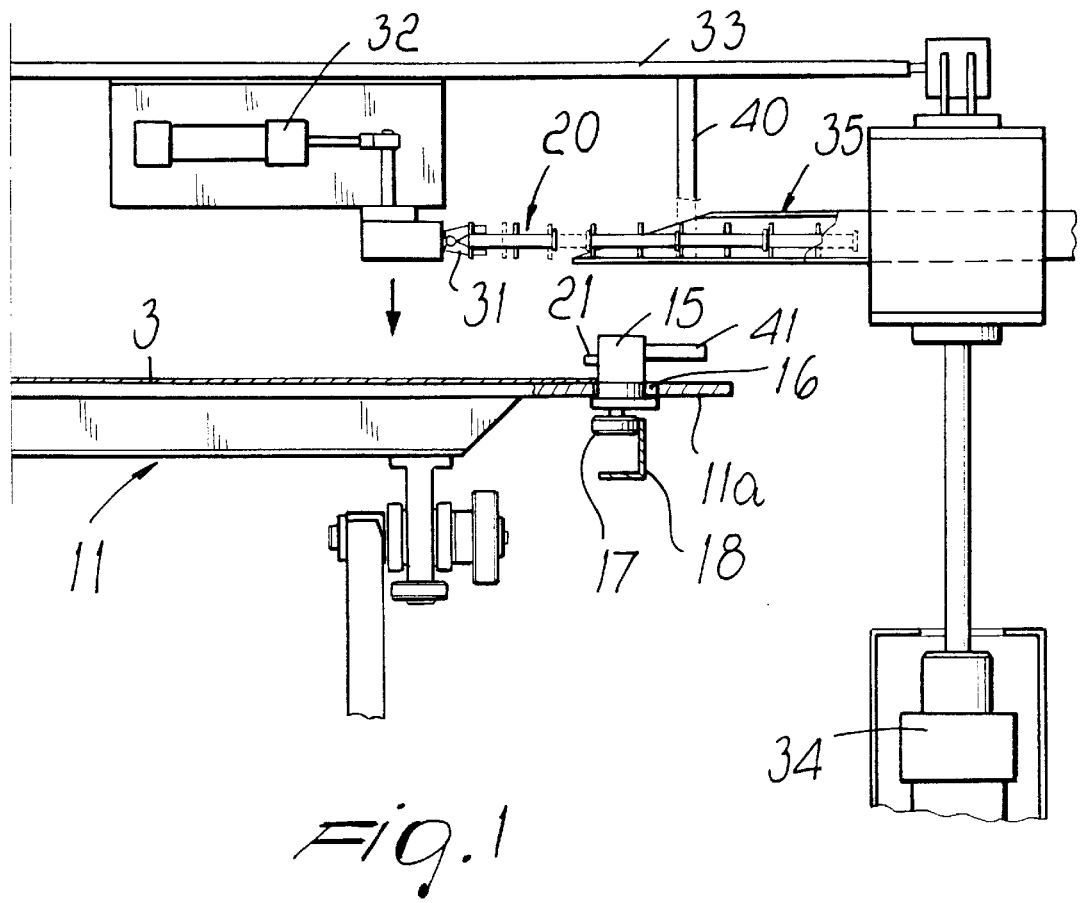
FIG. 1 is a schematic view of the apparatus during the picking step of an insert.

With reference to the figures, the apparatus for the continuous production of expanded plastics panels with inserts on their longitudinal edges, according to the invention, comprises a pouring head, generally designated by the reference numeral 1, which introduces a reactive mixture, in order to obtain a foamed layer, between a first layer 2 and a second layer 3 which can be constituted by any suitable material in sheet form and can have, in cross-section, any shape suitable and appropriate for the type of panel to be obtained.

Downstream of the region where the pouring head 1 is provided, there is an assembly for the containment and advancement of the first and second layers, which is generally designated by the reference numeral 10 and in a per se known manner is formed by a lower slat conveyor 11 which advances continuously and by an upper slat conveyor 12 which also advances continuously and partly overlaps the first slat conveyor, so as to form a region for the containment of the two layers 2 and 3 during the foaming step of the reactive mixture.

The slat conveyors 11 and 12 are formed respectively by slats 11a and 12a which are arranged mutually side by side and allow the slat conveyors to advance on conventional driving rollers.

The slats 11a of the lower slat conveyor have, at their longitudinal ends, lateral containment blocks 15 which in practice delimit the lateral edges of the panel being formed.

The blocks 15 are supported in longitudinally elongated slots 16 on the slat conveyor so as to be able to impart an extraction movement to the blocks 15 when the panel, now completely produced, is released by the slats.

In a per se known manner, the blocks 15 have a guiding roller 17 which engages a containment wing 18 which is interrupted at the lateral end and is replaced with an extraction wing 19 which imparts to the block 15 the outward translation movement, thus taking the block away from the panel, which is now completely formed.

The particularity of the invention consists in that at their face directed toward the panel being formed, the blocks 15 have means for engaging the inserts 20 to be incorporated.

The engagement means are advantageously formed by pins engagement 21 which enter corresponding holes formed at the inserts, which are applied to the corresponding pins 21 before the step of pouring the reactive mixture.

The inserts 20 are applied automatically by way of pick-and-placing means, generally designated by the reference numeral 30, which are constituted by grip means 31 being constituted by clamps, suckers or other per se known devices arranged at both ends of the slat.

The grip means 31 are actuated by a piston 32, one for each grip means provided at the lateral ends of the panels; the pistons 32 are adapted to actuate the grip means in order to pick the inserts from a conveyor 35.

Once the inserts have been picked, the grip means with the corresponding pistons, which are arranged on a crossbeam 33 movable on a vertical plane by the actuation of vertical translation movement cylinders 34, are translated in the vertical plane in order to lower the crossbeam 33.

The crossbeam 33 has an engagement rod 40 suitable to interfere with a corresponding pin 41 which protrudes correspondingly from the blocks 15 in order to synchronize the movement of the crossbeam and accordingly of the insert with the lower slat conveyor 11 and along the direction in which the slat conveyors 11 and 12 advance.

Figure 2:
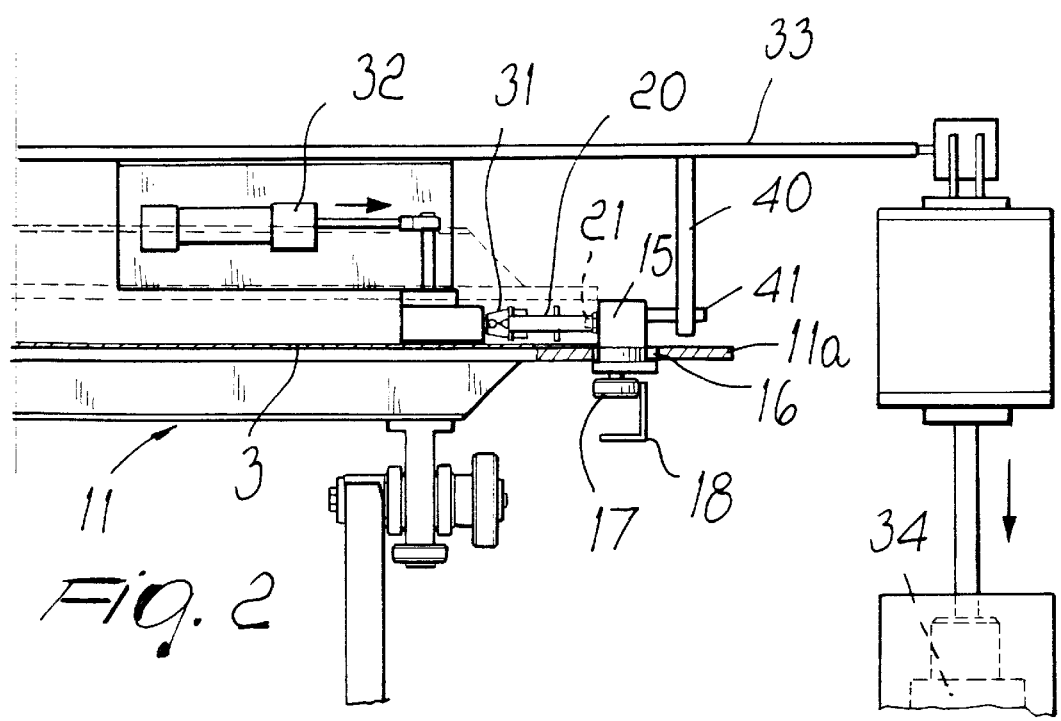
FIG. 2 is a schematic view of the apparatus during the coupling of an insert with the engagement means.
Figure 3:
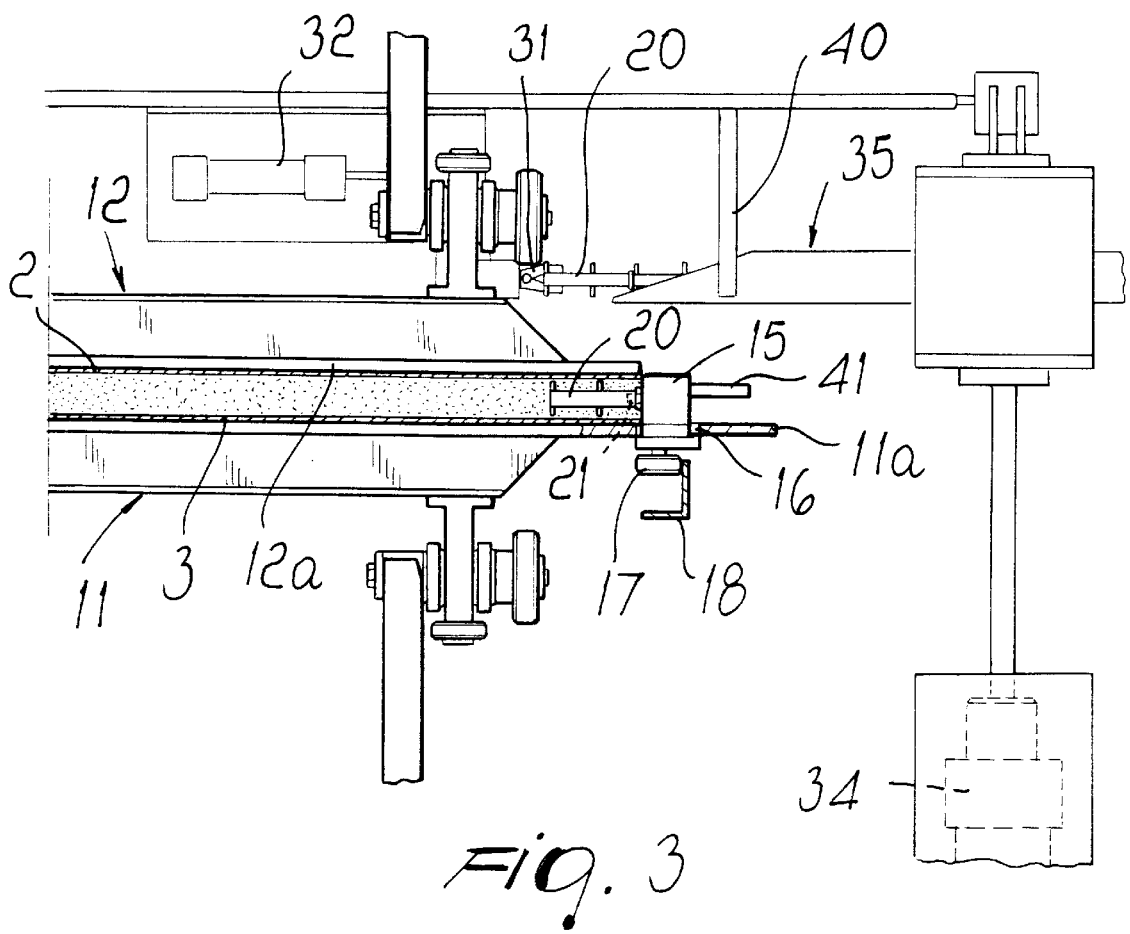
FIG. 3 is a view of the apparatus during the foaming step that incorporates the insert.
Figure 4:
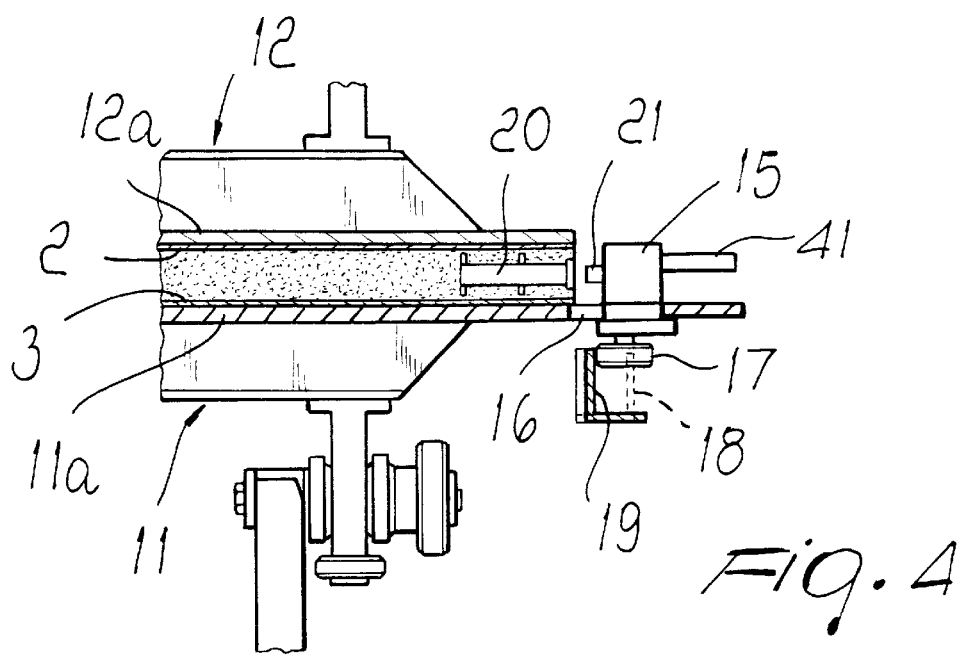
FIG. 4 is a schematic sectional view of the apparatus, taken along a vertical plane, during the disengagement step of the inserts from the lateral containment blocks.
Figure 5:
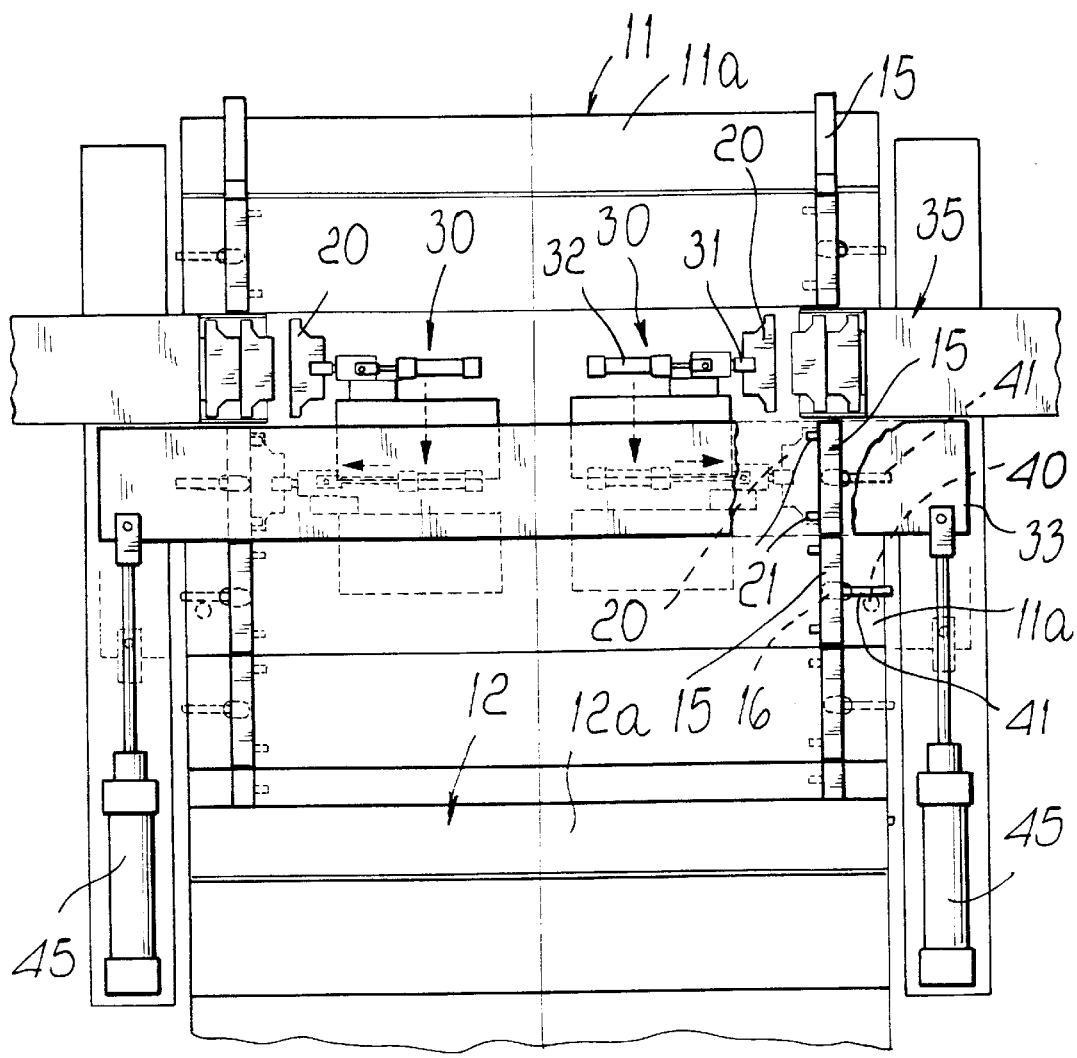
FIG. 5 is a schematic plan view of the apparatus.
Figure 6:
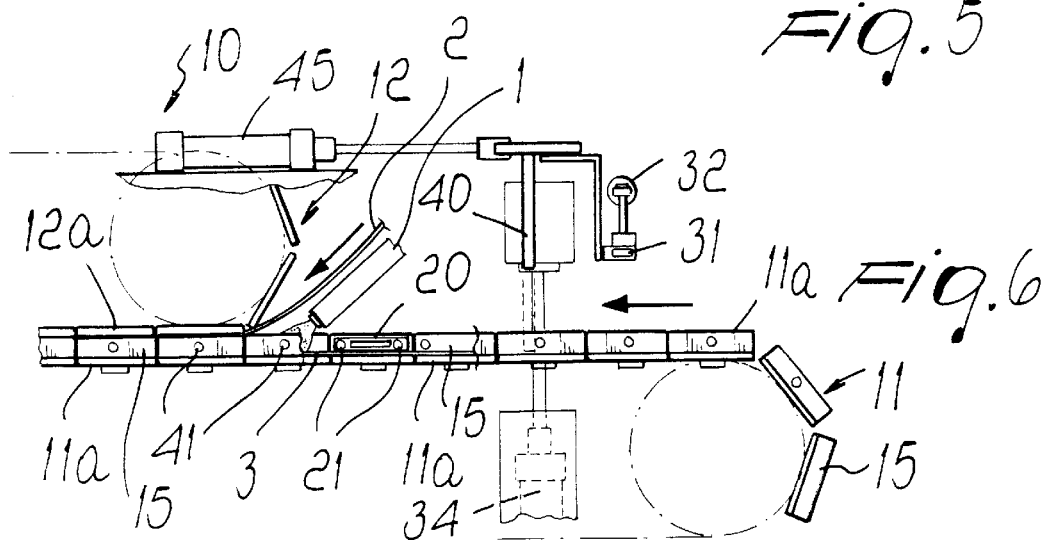
FIG. 6 is a side elevation view of the apparatus, taken at the region where the picking means and the pouring head are located.

As shown in FIG. 2, the engagement between the rod 40 and the pin 41 causes the synchronous translation movement of the crossbeam 33 with the corresponding slat of the slat conveyor, while the piston 32 places the insert on the engagement means which are constituted by the pins 21.

Once the coupling has been performed, the grip means leave the insert, the piston 32 draws the grip means inward, and the crossbeam 33 is taken up again by the translation movement cylinders 34.

A return piston 45 is also provided which forces the crossbeam 33 to return to the initial condition.

Advantageously, the piston 45 is of the elastically loaded type which provides the elastic compression of a compressible fluid during the step for the advancement of the crossbeam 33 and achieves elastic return when the rod 40 disengages from the pin 41.

With this arrangement, the inserts are supported by the blocks 15 and firmly retained in position until the foam, by polymerizing, incorporates them and stabilizes them.

At the end of the polymerization step, the blocks 15, due to engagement with the wing 19 of the roller 17, are extracted by releasing them both from the inserts and from the panel.

The operation of the apparatus entails therefore that on the slat conveyor is 11 the containment blocks, provided with the engagement means constituted by the pins 21, instead of the usual lateral containment blocks are placed according to the intended spacing or spacings.

The pick-and-placing means feeds the apparatus with the inserts, which are advantageously of the male type on one side and of the female type on the opposite side, and the two grip systems are advanced by the pistons 32 so that they pick the inserts from the conveyor 35. The grip systems are then retracted to disengage the inserts from the conveyors. Then the crossbeam 33 is lowered by way of the translation movement cylinders 34 or other suitable systems, bringing the rod 40 to engage one of the pins 41, so that the crossbeam 33 is advanced synchronously with the slat conveyor 11.

The inserts are then applied to the pins 21 by means of the actuation of the corresponding pistons 32, which position the inserts on the individual blocks.

The lowering of the crossbeam is actuated by a conventional system for identifying the passage of a block provided with the suitable engagement means on which the insert is to be inserted; the systems can be based on block counting or on other per se known systems.

The beginning of the horizontal movement for driving the crossbeam 33, by way of position sensors of any type known in the art, indicates that the crossbeam has been arranged with respect to the blocks 15 and controls the step of the application of the inserts to the pins 21.

Upon inserting the inserts, the grip devices move away and the beam is raised again, disengaging the rod 40 from the pin 41 and thus returning the beam to the initial position with a translation movement along the longitudinal direction of the slat conveyors.

The return pistons, by applying an adjustable pressure, ensure that during the horizontal advancement step the rod 40 of the crossbeam 33 always remains in contact with the corresponding pin 41 arranged on the blocks 15, avoiding any relative movements of the pins with respect to each other, with consequent loss of the relative position of the engagement devices and the modified containment blocks.

At the same time with or after the horizontal movement, the crossbeam is subjected to a further upward vertical movement in order to return to the initial level, which corresponds to the level of the insert conveyors 35.

At this point the apparatus is ready for a resuming a new cycle for inserting the inserts on the blocks 15 that are preset, i.e., provided with the pins.

During the step of growth and subsequent polymerization of the polyurethane foam, the inserts 20 arranged on the blocks are permanently incorporated in the panel.

When the panel exits the advancement and containment unit, the blocks disengage thanks to the possibility of performing a translation movement with respect to the longitudinal extension of the slats.

It should also be added that it is possible to interpose between the blocks and the various inserts, the normal protective layer, constituted by paper, adhesive tape, sponge, polythene or the like which is typically applied in the production of insulating panels in order to avoid any leakage of polyurethane which might soil or damage such panel and/or the containment blocks and/or the corresponding inserts.

From the above description it is thus evident that the invention achieves the intended aim and objects, and in particular the fact is stressed that automatic insertion of the inserts is performed with mechanically-provided assurance of perfect match-up and alignment on both sides and along the length of the panel, with the possibility to provide positioning with variable spacing without having to introduce constructive complexities in the machine.

The invention thus conceived is susceptible of numerous modifications and variations, all of which are within the scope of the appended claims.

All the details may further be replaced with other technically equivalent elements.

In practice, the materials used, as well as the dimensions and the contingent shapes, may be any according to requirements.

The disclosures in Italian Patent Application No. MI2000A002683 from which this application claims priority are incorporated herein by reference.

What is claimed is:

1. An apparatus for continuous production of expanded plastic panels having first and second containment layers and on longitudinal edges thereof inserts, comprising:
   a head for pouring a reactive mixture between the first and second containment layers for obtaining a foamed layer in which said inserts are incorporated;
   a containment and advancement assembly for said first and second layers; and
   said containment and advancement assembly comprising:
      a lower slat conveyor and an upper slat conveyor, said lower slat conveyor having a plurality of slats with lateral containment blocks arranged laterally of said lower slat conveyor at lateral ends of said slats for lateral containment of said inserts to be incorporated in said foamed layer; engagement means provided on at least part of said blocks for engaging said inserts at lateral faces of said inserts; and picking and placing means for picking and placing said inserts on said engagement means.

2. The apparatus of claim 1, wherein said lower slat conveyor is provided longer than said upper slat conveyor, in order to form a work area for said pick-and-placing means.

3. An apparatus for continuous production of expanded plastic panels having first and second containment layers and on longitudinal edges thereof inserts, comprising:
   a head for pouring a reactive mixture between the first and second containment layers for obtaining a foamed layer in which said inserts are incorporated;
   a containment and advancement assembly for said first and second layers; and
   said containment and advancement assembly comprising:
      a lower slat conveyor and by an upper slat conveyor, said lower slat conveyor having a plurality of slats with lateral containment blocks arranged at ends of said slats; engagement means provided on at least part of said blocks for engaging said inserts to be incorporated in said foamed layer; and picking and placing mans for picking and placing said inserts on said engagement means, said inserts being provided with engagement boles, said engagement means provided on at least part of said blocks comprising engagement pins which are insertable in corresponding ones of said engagement holes of maid inserts.

4. The apparatus of claim 3, further comprising a crossbeam which is movable on a vertical plane and performs a translation movement along an advancement direction of said lower slat conveyor, and an insert conveyor, said pick-and-placing means comprising grip means for picking said inserts from the insert conveyor, said grip means being arranged on said crossbeam.

5. The apparatus of claim 4, further comprising an actuation piston, said grip means being constituted by any of clamps, suckers or similar gripping elements which are actuated by said piston movable along a longitudinal extension direction of the slats of said lower slat conveyor.

6. The apparatus of claim 5, further comprising vertical translation movement means for moving of said crossbeam on the vertical plane.

7. The apparatus of claim 6, further comprising pins protruding each from a corresponding one of said blocks for mechanically synchronizing movements of said beam and of said lower slat conveyor, said crossbeam having an engagement rod which interferes with respective ones of said pins.

8. The apparatus of claim 7, further comprising a return piston for returning said crossbeam to an initial position thereof for translation movement of said crossbeam along the advancement direction of said lower slat conveyor.

9. The apparatus of claim 8, further comprising a containment wing and an extraction wing; longitudinally elongated slots provided at each of the slat conveyor; said blocks, being supported at both ends of said slats in said elongated slots; and guiding rollers being connected to each of said blocks; is each one of said rollers rotatably engaging said containment and extraction wings for moving said blocks away from a manufactured panel.

10. An apparatus operatable for continuous production of expanded plastic panels having first and second containment layers wit inserts on longitudinal edges thereof, comprising:
   a head for pouring a reactive mixture between the first and second containment layers for obtaining a foamed layer in which said inserts are incorporated;
   a containment and advancement assembly for said first and second layers; and
   said containment and advancement assembly comprising:
      a lower slat conveyor and an upper slat conveyor, said lower slat conveyor having a plurality of slats with lateral containment blocks arranged laterally of said lower slat conveyor at lateral ends of said slats for lateral containment of said inserts to be incorporated in said foamed layer; engagement elements provided on at least part of said blocks for engaging said inserts at lateral faces of said inserts; and picking and placing elements for picking and placing said inserts on said engagement means.

11. The apparatus of claim 1, wherein said picking and placing means is adapted to move said inserts in a lateral direction for engaging said inserts on said engagement means.

12. The apparatus of claim 11, wherein said picking and placing means is adapted to simultaneously move a pair of inserts in opposite lateral directions for engaging said pair of inserts on said engagement means.

13. The apparatus of claim 10, wherein said picking and placing elements are adapted to move said inserts in a lateral direction for engaging said inserts on said engagement elements.

14. The apparatus of claim 13, wherein said picking and placing elements are adapted to simultaneously move a pair of inserts in opposite lateral directions for engaging said pair of inserts on said engagement elements.

* * * * *